(12) United States Patent
Weathers, Jr.

(10) Patent No.: US 7,725,362 B2
(45) Date of Patent: May 25, 2010

(54) VIRTUAL GROUP SHOPPING MALL

(75) Inventor: Michael William Weathers, Jr., San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 11/777,106

(22) Filed: Jul. 12, 2007

(65) Prior Publication Data

US 2009/0018929 A1 Jan. 15, 2009

(51) Int. Cl.
G06Q 30/00 (2006.01)
G06Q 17/30 (2006.01)

(52) U.S. Cl. ............................. 705/26; 705/27; 725/37; 725/51; 725/60; 725/61

(58) Field of Classification Search .................. 705/1, 705/14, 26–27; 725/37, 51, 60–61
See application file for complete search history.

(56) References Cited

U.S. PATENT DOCUMENTS

| | | | |
|---|---|---|---|
| 6,587,835 B1 * | 7/2003 | Treyz et al. | 705/14 |
| 6,615,408 B1 * | 9/2003 | Kaiser et al. | 725/112 |
| 6,834,110 B1 * | 12/2004 | Marconcini et al. | 380/239 |
| 2002/0016965 A1 * | 2/2002 | Tomsen | 725/42 |
| 2002/0049635 A1 * | 4/2002 | Mai et al. | 705/14 |
| 2002/0059594 A1 * | 5/2002 | Rasmussen et al. | 725/37 |
| 2002/0065715 A1 * | 5/2002 | Tennyson et al. | 705/14 |
| 2002/0194604 A1 * | 12/2002 | Sanchez et al. | 725/60 |
| 2004/0220850 A1 * | 11/2004 | Ferrer et al. | 705/14 |
| 2007/0089150 A1 * | 4/2007 | Bowler | 725/113 |
| 2007/0113243 A1 * | 5/2007 | Brey | 725/32 |
| 2007/0185768 A1 * | 8/2007 | Vengroff et al. | 705/14 |
| 2007/0192206 A1 * | 8/2007 | Manesh et al. | 705/26 |
| 2007/0239552 A1 * | 10/2007 | Sundaresan | 705/26 |
| 2008/0071602 A1 * | 3/2008 | Ojakaar et al. | 705/10 |
| 2008/0228600 A1 * | 9/2008 | Treyz et al. | 705/27 |
| 2008/0312946 A1 * | 12/2008 | Valentine et al. | 705/1 |

OTHER PUBLICATIONS

Terion Announces FleetView Product Enhancement—Active Geofencing, Nov. 30, 2004, Business Wire.*
"Time Warner Cable's Full Service Network connects live to Innoventions". Business Wire, p. 4101142, Apr. 10, 1996 [recovered from Dialog on Dec. 18, 2009].*

(Continued)

Primary Examiner—Jeffrey A. Smith
Assistant Examiner—William J. Allen
(74) Attorney, Agent, or Firm—Richard A Bachand; Fariba Yadegar-Bandari

(57) ABSTRACT

As a movie/television show, etc. is being watched, a viewer is able to purchase items viewed during a presentation. A viewer may stop the presentation either to purchase merchandise or services or alternatively, save items for later in a "virtual group shopping mall." A voice or written message may be added to allow more content to be placed with each saved item. A group may be identified and given access to the virtual shopping mall. This enables members of the group, such as friends, to see shopping preferences of others in a group. Further, shopping lists may be generated for group members based upon items placed in the virtual mall, thereby enabling a list of "must haves" for the group. Purchases may be made using M-commerce or a potential purchaser may be directed to a store having a product or service desired for purchase.

37 Claims, 4 Drawing Sheets

OTHER PUBLICATIONS

International Search Report, PCT/US08/069983, International Search Authority, United States, Dec. 12, 2008.
Written Opinion, PCT/US08/069983, International Search Authority, United States, Dec. 12, 2008.
European Search Report, EP08102966, European Patent Office, Munich, Germany, Oct. 15, 2008.
"Statement in accordance with the Notice from the European Patent Office dated Oct. 1, 2007 concerning business methods," Official Journal of the European Patent Office, Nov. 1, 2007, pp. 592-593, European Patent Office, Munich, Germany, XP002456252.

* cited by examiner

VIRTUAL GROUP SHOPPING MALL

BACKGROUND

With the advent of fairly recent changes in media outlets enabled by the Internet, mobile video phones, video personal digital assistants (PDAs), smartphones and digital video discs (DVDs), in particular, represent avenues for a paradigm, shift underway in advertising and provide an "on-line" focus. Advertising on the Internet is increasing annually while siphoning advertising sales from traditional media such as print newspapers. Currently, one metric for determining the effectiveness of Internet advertising involves counting the number of daily visitors received at a site. However, this method gives an indirect measure of how many times a particular advertisement is viewed. This perhaps accounts for why Internet ads account for less than a tenth of the revenues and profits associated with advertising using both print and on-line ads.

Along with a shift in advertising methods, media in general has undergone a transformation. For instance, a greater percentage of revenue in recent years for motion pictures can be accounted for in DVD and movie-on-demand sales such as pay-per-view as compared with revenues generated at the box office. Often, ads of some type are included with DVDs and movie-on-demand broadcasts. These ads may be little more than a focused display of a vehicle used or a watch or article of clothing worn by an actor us the movie proceeds. However, the value of that advertising on those forums is indeterminate since generally, only a limited number of ads for products can be practically featured. Further, there is no direct way of accounting for sales attributable to this form of advertising.

A need exists to improve the effectiveness of Internet (e.g., Web) advertising while taking advantage of the proliferation of fairly new technologies and devices that have Internet access. A need also exists, to improve the ability to measure the effectiveness of Internet advertising.

Figure 1:
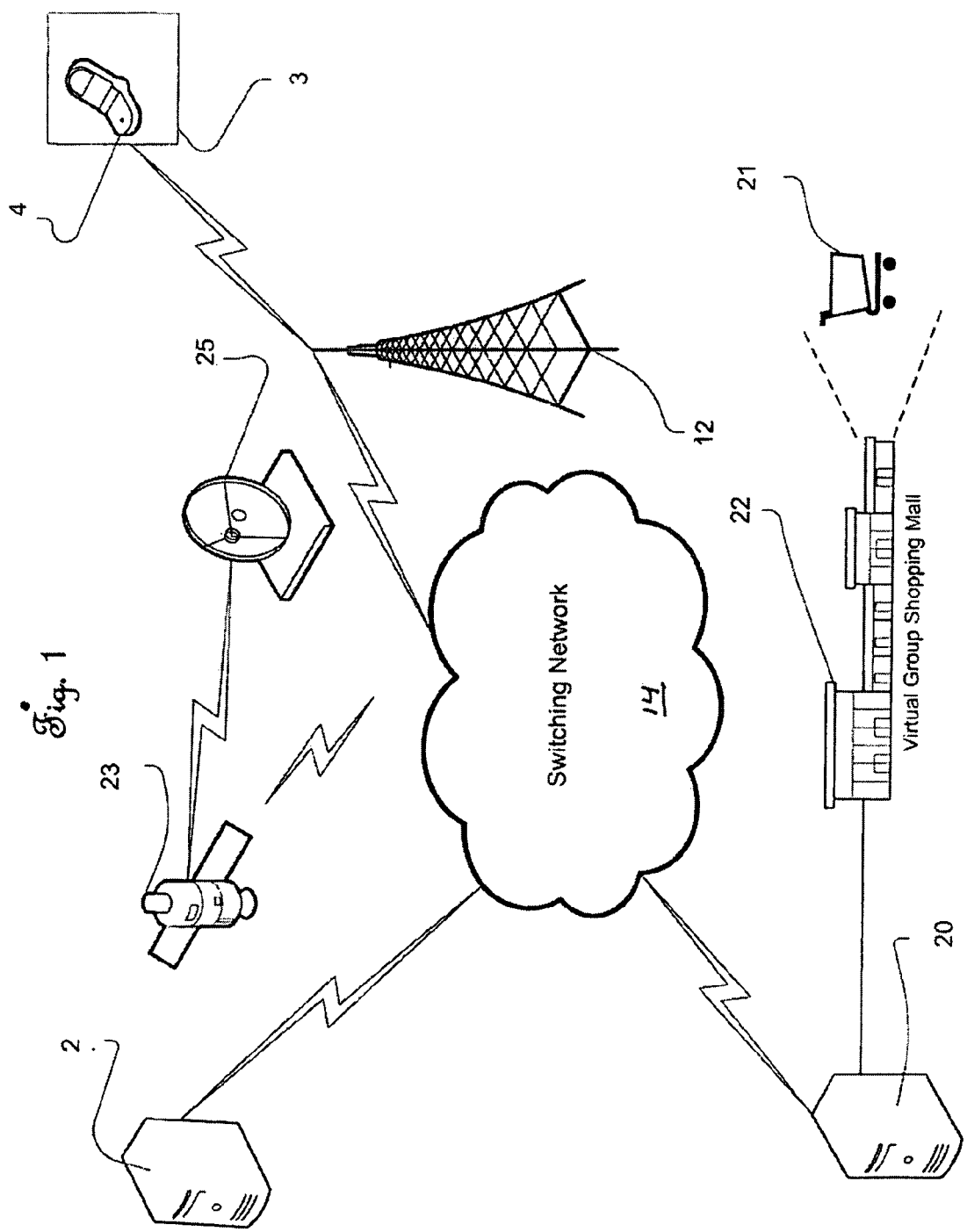
FIG. 1 illustrates a diagram of one embodiment of a unicast implementation.

Applicable reference numerals have been carried forward.

DETAILED DESCRIPTION

The foregoing discussed needs can be filled by enabling a viewer of media content to conveniently receive information and/or purchase items or services viewed in connection with, a media broadcast, particularly in a mobile environment.

In many of today's systems, video is presented to mobile users as streaming date. In these cases, the mobile unit (e.g. mobile video phone, FDA, video game device such as a Sony® PSP™, etc.) is a passive consumer of the data, audio or video.

As a presentation, such as a movie or television show, is being watched in any number of environments, such as a mobile environment, items may be selected for further examination/information, immediate purchase or placement into a virtual, "shopping cart" and or a "virtual shopping mall" accessible by members of an identified group. In one embodiment, items selected may pop-up in a separate browser window. A menu of items may be presented in the window which includes various shopping categories (clothes, furniture, room decor, etc.). An entire industry may be built up around cataloging such items and building the associated relationships into the catalog concerning items produced by manufacturers. While manufactures may be willing to pay content providers such as television studios for product placement, they may likely just as well pay an addition premium for product purchase and information requests as will be disclosed herein.

A system implementing a virtual group shopping mall may allow mobile users to do the following: select merchandise while viewing various media such as one or more television programs, videos, DVD content, all of which may include advertisements; receive basic information and optional supplemental information on merchandise viewed; reserve merchandise for future purchase; and purchase selected merchandise that was viewed on the media.

For each content presentation (e.g. movie, video, etc.), a virtual catalog containing pictures of all items, e.g, those associated with a character (e.g. actor), may be made available and enabled for viewing through the viewing device for more information or purchase. Additionally, items need not be associated with a particular character in order to obtain information or purchase options. The item need only appear for viewing or be associated with an item viewed. Further embodiments include providing a larger picture of an item considered for purchase, and featuring: an M-commerce (e.g., the use of smartphones, handheld computers and the like to wirelessly conduct business over the Internet) price; an option to purchase the item immediately or an option to locate the nearest store stocking the item.

A "purchase now" option may be provided to a viewer through the manufacturer/retailer that will be shipping a product. A locate-nearest-store-with-product option may show to a viewer, for instance, the three nearest stores having a product along with the product price.

A revenue stream may be generated by charging retailers premium placement on how they are prioritized for directing purchases thereto.

Unicast Scenario

From the service provider's perspective, providing a unicast offers the advantage of a pay-per-view service since viewers are choosing and paying for the service on demand. With unicast, separate video, audio or text data streams are sent to each device requesting data. The unicast may be accomplished using a number of methods including using wireless transmission over a digital mobile communication system accomplished using code division multiple access (CDMA), Universal Mobile Telephone System (UTMS), time division multiple access (TDMA), frequency division multiple access (FDMA) or the like. Additionally, the unicast may be accomplished using aspects of satellite communication as well as using wired terrestrial communication. Further, the unicast may be accomplished using some combination of wireless and/or wired terrestrial communication and satellite communication.

Content providers may flag a plethora of items and/or services for purchase, for the provision of information on how to buy, and or where to buy, etc. For instance, should the star of the movie dine at a particular pizza parlor in Chicago, information on the location of the restaurant, its menu and even delivery/take out information may be provided. In a similar manner, national and local services can be advertised and selected for purchase, including trips to an amusement park, laundry service, florist services, and even services from a local professional, such as an appointment with an accountant, doctor or lawyer. The purchase or information request according to the systems disclosed herein may be offered in connection with the showing of an advertisement for such service. Consequently, all or part of the services shown available to the actor in the movie or commercial may be made available to the viewer, whether on a local, national or international scale. Should the co-star of the movie drive past in a flashy car, specifications on the car, where to purchase the car locally and finance information may be provided. Should the leading lady present herself to viewers for the first time wearing a snazzy red dress, perhaps that information on the dress, where to purchase it locally and how to purchase it on-line or substantially contemporaneously with the unicast may be provided.

At the end of a unicast, a catalog listing all items presented for purchase, advertisement and/or other information may be displayed.

In order to implement the foregoing described unicast, markers may be inserted within the streamed data according to a timeline which may otherwise be used for synchronizing audio with video. The markers may be manifest within the unicast as a symbol such as a colored dot or other representation that may indicate a uniform resource locator (URL). The resource upon which the unicast is being viewed may be used to view the URL as well. For instance, in connection with watching a movie that is being provided via unicast, a cursor may be used to point and click a selected symbol corresponding to a specific URL. Such a cursor control is common on laptops and notebook computers and such a tool would likely be found on most devices used for viewing a unicast. Alternatively, position arrows may be used for choosing a symbol to select and view a URL. The URL may provide a web address, enabling purchase of, or more information about, an article, object or service viewed during the unicast.

With reference to FIG. 1, which illustrates a diagram of one embodiment of a unicast implementation, streaming data server 2, as its name suggests, may provide streaming video and/or audio content to device 3, such as mobile phone 4. Preferably, there are several streaming data servers so as to provide content source replication in an effort to reduce transaction response time. Communication links are shown in standard notation linking the various elements shown in FIG. 1. In connection with selection of content through one of the aforementioned devices (or other device for viewing content), server 2 provides a unicast link to the device via switching network 14 which represents either the PSDN, Public Switching Data Network, or the PTSN, Public Switching Telephone Network or both (PSDN and PSTN). The actual content (e.g. program or service) is formatted in a manner that allows for interaction and control of the data stream. Further, in an aspect using mobile devices, the actual content (e.g. program or service) is formatted in a manner that allows for mobile interaction and control of the data stream.

Existing formats such as MP3, MPEG and H.263 may be altered to support content as used herein or alternatively a new format for video may be developed in order to support services disclosed herein which require further support or additional protocols. In one implementation, the data in the stream can be formatted with markers corresponding to the merchandise and or service, shown in the content, which is to be sold. In this implementation, streaming data is sent from server 2 to one of the viewing devices such as mobile phone 4. The device such as mobile phone 4, upon detecting special keys resident in the marker (such as a URL) or in connection with a key stroke or combination of key strokes, for selecting a marker, at the device such as mobile phone 4, sends a message to the Base Station Controller, BSC 12. BSC 12 which may be connected to mobile switching center (MSC) 14 may forward key-press data to MSC 14, a backbone switch for telephone service providers, that may convert the detected key press into a message (not shown) that is sent to server 2 through switching center 14, e.g. PDSN and/or PTSN.

Upon receipt of the message, server 2 pauses the data stream and connects to catalog server 20 which contains a catalog (not shown) of the merchandise and services offered in the data stream. Preferably, there are several catalog servers so as to provide catalog replication in an effort to reduce transaction response time. In one aspect, the catalog has the capacity to show different perspectives of the merchandise and it's price. The viewer may select merchandise, place it into virtual shopping cart 21 and continue viewing the content such as a program (and thus continue the data stream) with another key press. Alternatively, the viewer may select merchandise and place it in a virtual group shopping mall 22. Virtual group shopping mall 22 may be set-up so that the viewer may allow access to it by others, or rather a group of people, e.g., friends, acquaintances, relatives, strangers along with the option to save a message, either verbal, written or otherwise corresponding to the marked unicast data which corresponds to selected merchandise sent to the virtual shopping mall, hence the name.

In one embodiment, everyone with access to mall 22 may save messages corresponding to the selected merchandise. In another embodiment, voice messages may be added with the ability to group content around the merchandise displayed in the virtual shopping cart or at the virtual shopping mall 22.

The link to catalog server 20 is disconnected and the link to streaming server 2 is restored in connection with continuing the program from the point where the streaming data was stopped to view the merchandise or service.

In one embodiment, actual purchases may be made via an m-commerce method such as PayPal® or alternatively, a product purchased may be directed to a store for pick up.

Satellite 23 together with satellite dish 25 may be part of a satellite communication system through which the foregoing system may be carried out in making the necessary connections among a requesting device, streaming data server 2 and catalog server 20.

Figure 2:
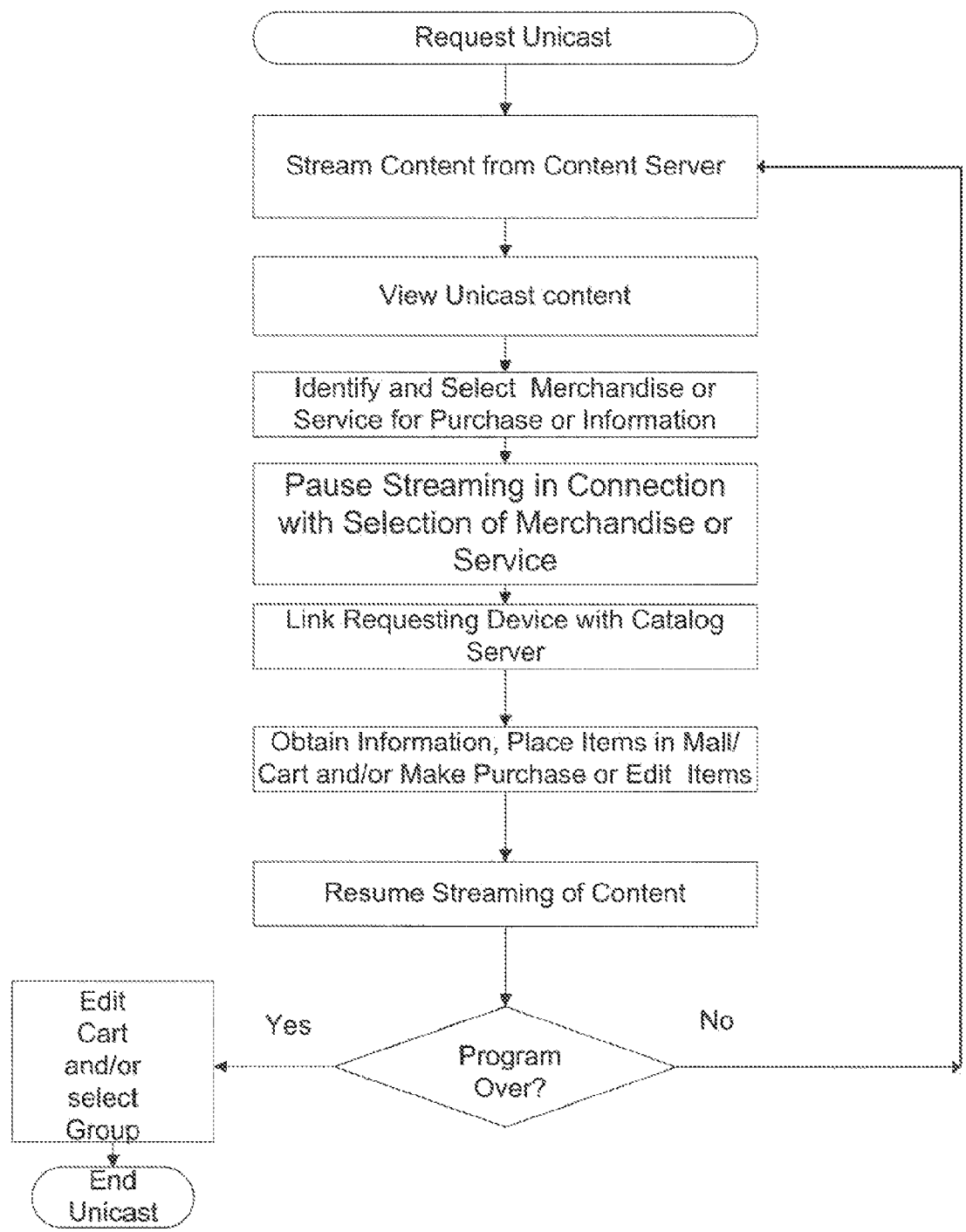
FIG. 2 illustrates a flowchart showing a purchase/information request process flow.
Figure 3:
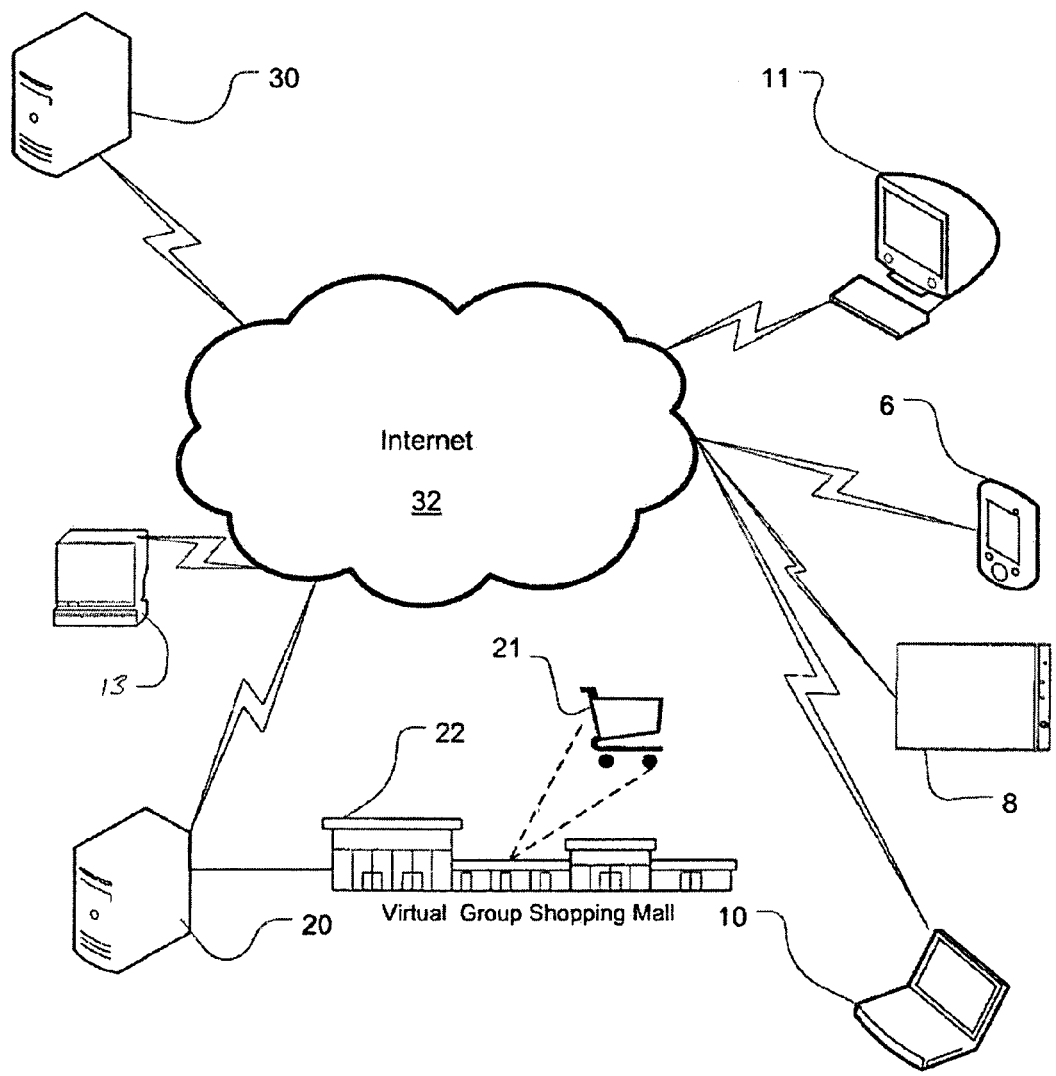
FIG. 3 illustrates a diagram of one embodiment of a podcast implementation.

FIG. 2 illustrates a flowchart showing the foregoing purchase/information request process flow. This process can be repeated until the entire program is completed. At the end of the program or during the program the viewer may edit the contents of his cart and even order the merchandise. Further, merchandise in the shopping cart Podcast Scenario The marking and cataloging of merchandise may also be a value-added service sold to manufacturers and, service providers interested in developing new revenue streams for the emerging PDA and podcast markets. The marking of numerous products and services for sale using this marketing approach may be labor intensive and may require many hours of editing to mark merchandise and services for information and purchases. An entire industry concerned with such may be spawned. However, there is almost no limit to the type of content to which this technology may be applied. FIG. 3 illustrates a diagram of an embodiment of a video podcast implementation. Video podcasts are similar to television shows and/or advertisements which can be downloaded from the Internet. A video podcast may be distributed as a file or in connection with streaming from a web server. Streaming is better suited for use with large amounts of data, subject to pauses in playback caused by slow transfer speeds, while downloading a complete file of a video podcasts gives a viewer the ability to play video podcasts offline.

Video podcasts can typically contain content such as movies, advertisements, news, etc. and they may be supplemented with markers, URLs and other added symbols or artwork. Further, video podcasts may be enhanced with both video and audio content. With reference to FIG. 3, it may be possible to view video podcasts over PDA 6, video game device 8 (e.g. a mobile video game device such as Sony® PSP™, or a stationary video game device such as Microsoft®'s XBOX™, Microsoft®'s XBOX 360™), a computer (e.g., a laptop 10, iMac®11, or workstation 13, all of which may be capable of communicating wirelessly, e.g., with a Wi-Fi connection), etc. A variety of systems/formats may be used to view a video podcast such as iTunes®. Web server 28 provides the content from which the podcast content is sourced. Preferably, there are several web servers so as to provide content source replication in an effort to reduce transaction response time. Further web-caching may be used to improve transaction response time.

URL markers may be inserted into the podcast at selected portions of the podcast timeline. The markers may appear for instance as an Internet address (e.g., Web address) or as artwork providing an active link to an Internet address. In one implementation, streamed data is formatted with markers corresponding to the merchandise and or service, shown in the content, which is to be sold. In this implementation, streaming data is sent from server 30 to one of the viewing devices such as PDA 6, video game device 8 or computers 10, 11, or 13. In another implementation, podcast data, with the markers discussed above, may be downloaded as one or more files and sent from server 30 to one of the viewing devices (e.g., 6, 8, 10, 11 or 13. The resource upon which the podcast is being viewed may be used to view the URL as well. For instance, in connection with watching a movie that is being provided in a podcast, a cursor may be used to point and click a selected symbol corresponding to a specific URL or an Internet address, etc. displayed prominently on-screen. Such a cursor control is common on computers, video games and video devices. Other methods for selecting a URL may be possible. The URL may provide a Web address enabling purchase of, or more information about, an article, object or service viewed during the podcast.

In connection with selecting a URL, the corresponding Web page is opened in the viewer's Internet browser on the device used to view the podcast. Podcasts may be contain playback options displayed as buttons on-screen such as pause, rewind, fast forward, stop, play, etc. Accordingly, these options may be used to pause the action while merchandise is being viewed, purchased, etc. Information requests and purchases may be handled through catalog server 20 which may connect through the Internet 32.

The viewer may select merchandise, place it into virtual shopping cart 21 and continue viewing the content such as a program. Alternatively, the viewer may select merchandise and place it in the virtual group shopping mall 22. Still alternatively, virtual shopping cart 21 may be part of virtual group shopping mall 22 wherein access to mall 22 permits access to view and comment on items in cart 21. Virtual group shopping mall 22 may be set-up so that the viewer may allow access to it by others, or rather a group of people, e.g., friends, acquaintances, relatives, strangers along with the option to save a message, either verbal, written or otherwise corresponding to the marked podcast data which corresponds to selected merchandise sent to the virtual shopping mall. In one embodiment, everyone with access to mall 22 may save messages corresponding to the selected merchandise. In another embodiment, voice messages may be added with the ability to group content around the merchandise displayed in the virtual shopping cart or at the virtual shopping mall 22.

In one embodiment herein including other scenarios discussed herein, products and services may be selected by a viewer using a voice command. For instance, while a viewer is watching a presentation, a button may be pressed or a voice command spoken indicating favorable disposal toward an item viewed, e.g. "I love Rachel's jeans." This spoken phrase, identified though voice recognition software or firmware in a viewing device causes the item, e.g., jeans, to be placed within the virtual shopping mall where comments, taglines, etc. may be provided by group members.

Broadcast Scenario

The broadcast scenario for this technology application is very similar to the unicast. In the broadcast scenario the streaming server is broadcasting the data to all connected mobiles. A view can join the program in progress instead of initiating the service on-demand. Broadcast network, such as television, cable and satellite network may be used to transmit rich, high quality, synchronized audio and video content to a large population of viewers. These networks may include content obtained over the Internet. Broadcast networks are scalable due to their point-to-multipoint transmission nature. Generally, no greater substantial resources or bandwidth is required to send content to a million viewers as it does to one viewer. By comparison, each location that is targeted to receive content, in most Internet transmissions, adds to the level of overall resources required to complete the transmission. The point-to-multipoint nature of broadcast networks permits the delivery of content with more precise performance. Generally, there are substantially no variations in the propagation delay through the network in delivery of content to viewers. A broadcast network may include delivery through a digital satellite systems, today distribute content to a very large, highly dispersed set of locations. The content may be locally cached and then served to viewers that connect and obtain content either directly or through a service provider.

Figure 4:
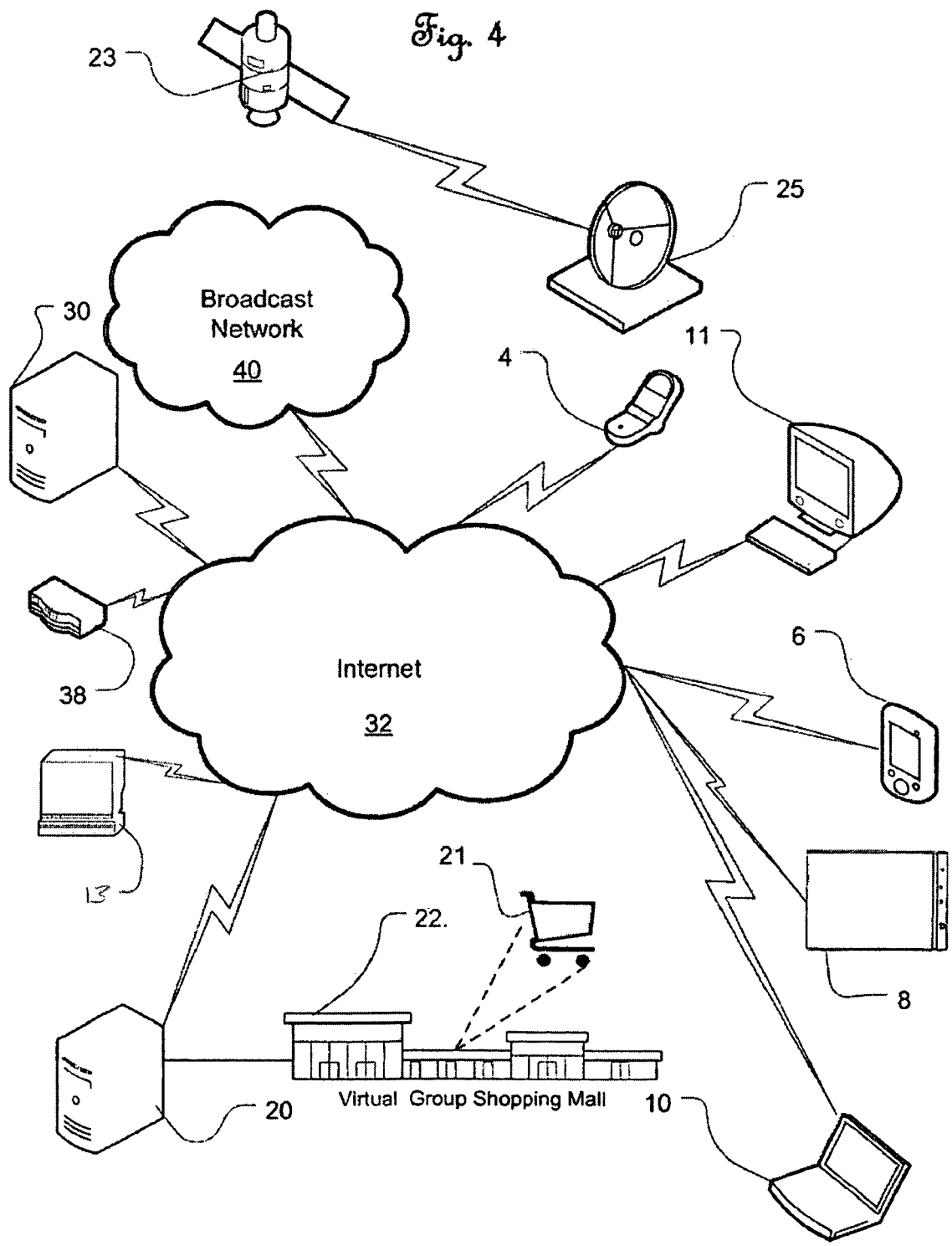
FIG. 4 illustrates a diagram of one embodiment of a broadcast implementation.

With reference to FIG. 4 which illustrates an embodiment using broadcast Internet. Content router 38 serves to send Internet content from server 30 including catalog and marker data appropriately synchronized with the content, which may be aggregated by router 38 within a single Moving Pictures Experts Group (MPEG)-type (e.g. MPEG 2) transport stream that it may forward appropriately over traditional data networks. The content may be filtered, format converted, rebroadcast (or remulticast) or tunneled to servers, such as cache servers or streaming servers. Internet content may be aggregated by software which may also provide a framework for the creation, re-purposing and delivery of Internet-based services such as obtaining information or ordering products or services as explained above with the afore-discussed embodiments, using broadcast networks 40 or a combination of both broadcast and broadband networks. This software will be used to create announcements for Internet-based services, manage the use of broadcast bandwidth and schedule the delivery of Internet content.

The viewer will still be capable of selecting merchandise where as in the unicast case with an index or pointer to the location of the merchandise on catalog server 20. Catalog server 20 is then connected to the viewer's viewing device, such as a mobile 4 and the viewer may then view the merchandise on the server. However once the viewer is done with the catalog selection he is allowed to reconnect to the streaming data server. In contrast, the broadcast scenario does not allow the viewer to viewer to return to point at which he first paused the program. The viewer will return to the program in progress. In an effort to not miss any content, in one embodiment the viewer may dump items into virtual group shopping mall 22 for review, comment by group members (those authorized to enter the mall), purchase, etc.

Catalog server 20 may be a series of servers to support a large volume of requests. In addition, a prioritized queue could be configured to handle quality of service request.

In connection with confirming purchases or generating a level of confidence that a product advertisement is effective, in the case where particularly purchases are made using a mobile phone or other mobile device, a map to a store may be provided and a geofence may be placed around the store for which an indication was given during a content viewing that a product or service is available. Thereafter, should a person carrying the mobile phone or mobile device pass through the geofence within some reasonable time frame, confirmation may be received indicative that the visit or purchase was due to the content viewed.

Mobile commerce and charging (MCC) is enabled herein providing a revenue stream for advertisers, mobile virtual network operators (MVNO) etc. Further, MCC will allow a direct measurement impact of product advertisements through purchases made using MCommerce.

The foregoing offers an advantage in presenting a measurement opportunity highlighted by the ability to measure viral (word of mouth) marketing. For instance, virtual mall activity can be monitored for number of mall attendees, product viewings at the mall and any activity which takes place through the interaction of people using the virtual group shopping mall. When people make purchases at the virtual group shopping mall of products placed in the mall by other group members, measurement may be made of viral marketing and its effectiveness, e.g., how the desires of group members influenced purchases of other group members.

Those of skill in the art would understand that information and signals may be represented using any of a variety of different technologies and techniques. For example, data, instructions, commands, information, signals, bits, symbols, and chips that may be referenced throughout the above description, may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed in conjunction with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a viewer's viewing device. In the alternative, the processor and the storage medium may reside as discrete components in a viewer's viewing device The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For instance, embodiments are contemplated using the foregoing wherein multiple television shows or content is broadcast, unicast or podcast to a mobile unit such as a mobile phone (including a smartphone), PDA or other mobile device. Thus, the present invention is not intended to be limited to the embodiments shown herein but is to be accorded the widest scope consistent with the principles and novel features disclosed herein.

The invention claimed is:

1. A system for enabling remote shopping transactions comprising:
   a content server configured to receive a viewer selection of streaming content from an electronic device, the streaming content having embedded therein one or more markers corresponding to merchandise or services shown in the streaming content, the content server further configured to provide a unicast link to the electronic device upon receipt of the selection, the unicast link providing the streaming content to the electronic device;
   a catalog server comprising hardware configured to store a catalog of the merchandise or services shown in the streaming content, wherein the catalog server is further configured to receive a connection request from the content server;
   wherein the content server initiates the connection request upon receiving a selection of at least one of the one or more markers in the streaming content and establishes a connection between the catalog server and the electronic device for viewing the catalog;
   wherein the content server is further configured to pause the streaming content upon establishing the connection between the catalog server and the electronic device, and to resume the streaming content from a point where the streaming content was paused upon disconnecting the connection between the catalog server and the electronic device; and a virtual group shopping mall comprising information corresponding to the merchandise or the service corresponding to the selection, wherein the virtual shopping mall is accessible by selected entities allowed by the viewer.

2. A system as recited in claim 1 wherein the catalog server is further configured to enable a purchase of the merchandise or services.

3. A system as recited in claim 1 wherein the catalog server is further configured to provide information concerning the merchandise or the service corresponding to the selection.

4. A system as recited in claim 1 wherein said virtual group shopping mall stores a shopping list of the merchandise or the service corresponding to the selection.

5. A system as recited in claim 4 wherein said access provides said selected entities with an ability to view the shopping list.

6. A system as recited in claim 4 wherein said access provides said selected entities with an ability to add additional content to said mall corresponding to merchandise or the service corresponding to the selection.

7. A system as recited in claim 1 wherein said content server is operable to transmit data to said viewer by file transfer.

8. A system as recited in claim 1 wherein said content includes audio and video content.

9. A system as recited in claim 1 wherein said selected entities comprise at least one of friends, relatives, or strangers with respect to said viewer and any combinations thereof.

10. The system as recited in claim 1, wherein the catalog server is further configured to provide location information of a store having the merchandise or services based on the receiving of the viewer selection; and
wherein the location information further comprises a map.

11. The system as recited in claim 1, wherein the one or more markers further corresponds to an actor or character viewable within the content, and wherein the selection indicates interest in a specific merchandise or a specific service corresponding to the actor or the character.

12. A system as recited in claim 1, wherein said virtual group shopping mall provides an ability to monitor purchases by one or more of the selected entities to determine the effectiveness of viral marketing.

13. A computer-implemented method of enabling shopping transactions, the computer including a processor and a storage medium, the method comprising:
receiving a viewer selection of streaming content from an electronic device, the streaming content having embedded therein one or more markers corresponding to merchandise or services shown in the streaming content;
creating, by the processor, a unicast link to the electronic device upon receipt of the viewer selection, the unicast link providing the streaming content to the electronic device;
transmitting a connection request to a catalog server upon receipt of a selection of at least one of the one or more markers in the streaming content;
providing, to the electronic device, a connection to the catalog server, the catalog server storing a catalog of the merchandise or services shown in the streaming content;
pausing the streaming content upon providing the connection to the catalog server and resuming the streaming content from the point where the streaming content was paused upon disconnecting the connection between the catalog server and the electronic device; and
enabling the placement of the selection within a virtual shopping mall, the mall being accessible by members of a group selected by the viewer.

14. A method as recited in claim 13 wherein said one or more markers identify merchandise appearing within said content viewed by said viewer.

15. A method as recited in claim 13 wherein said one or more markers identify services identified within said content examined by said viewer.

16. A method as recited in claim 13 further comprising providing information about the selection.

17. A method as recited in claim 13 further comprising enabling purchase of the selection.

18. A method as recited in claim 13 further comprising creating a shopping list from the selection.

19. A method as recited in claim 18 wherein said shopping list is made available, on the catalog server, to members of a group and wherein members of said group make associated shopping lists available, on said catalog server, among said members of said group.

20. A method as recited in claim 13 wherein said content is provided to said viewer using a podcast.

21. A method as recited in claim 13 wherein said content is provided to said viewer using a broadcast.

22. A method as recited in claim 13 wherein said device is a mobile device.

23. A method as recited in claim 22 wherein said mobile device is a mobile phone.

24. The method as recited in claim 13, further comprising:
enabling members of the group to add supplemental content to the selection that is placed in the virtual shopping mall.

25. The method as recited in claim 13, further comprising:
providing location information of a store having the merchandise or services based on the receiving of the viewer selection; and
wherein the providing of the location information further comprises providing a map.

26. The method as recited in claim 13, wherein the one or more markers further corresponds to an actor or character viewable within the content, and wherein receiving the selection indicates interest in a specific merchandise or a specific service corresponding to the actor or the character.

27. A method as recited in claim 13, further comprising:
monitoring purchases by the members of the group selected by the viewer to determine the effectiveness of viral marketing.

28. An apparatus for enabling shopping transactions, comprising:
means for receiving a viewer selection of streaming content from an electronic device, the streaming content having embedded therein one or more markers corresponding to merchandise or services shown in the streaming content;
means for creating a unicast link to the electronic device upon receipt of the selection, the unicast link providing the streaming content to the electronic device;
means for transmitting a connection request to a catalog server upon receipt of a selection of at least one of the one or more markers in the streaming content by a viewer;
providing, to the electronic device, a connection to a catalog server, the catalog server storing a catalog of the merchandise or services shown in the streaming content;
means for pausing the streaming content upon providing the connection to the catalog server and resuming the streaming content from the point where the streaming content was paused upon disconnecting the connection between the catalog server and the electronic device; and means for enabling the placement of the selection within a virtual shopping mall, the mall being accessible by members of a group selected by the viewer.

29. The apparatus as recited in claim 28, further comprising:

means for enabling members of the group to add supplemental content to the selection that is placed in the virtual shopping mall.

30. The apparatus as recited in claim 28, further comprising:

means for providing location information of a store having the merchandise or services based on the receiving of the viewer selection; and wherein the location information further comprises a map.

31. The apparatus as recited in claim 28, wherein the one or more markers further corresponds to an actor or character viewable within the content, and wherein the selection indicates interest in a specific merchandise or a specific service corresponding to the actor or the character.

32. An apparatus as recited in claim 28, further comprising:

means for monitoring purchases by the members of the group selected by the viewer to determine the effectiveness of viral marketing.

33. A computer program product embodied in a tangible computer readable medium, for enabling shopping transactions, comprising:

first module executable by a computer for receiving a viewer selection of streaming content from an electronic device, the streaming content having embedded therein one or more markers corresponding to merchandise or services shown in the streaming content;

a second module executable by the computer for creating a unicast link to the electronic device upon receipt of the selection, the unicast link providing the streaming content to the electronic device;

a third module executable by the computer for transmitting a connection request to a catalog server upon receipt of a selection of at least one of the one or more markers in the streaming content by a viewer;

a fourth module executable by the computer for providing, to the electronic device, a connection to a catalog server, the catalog server storing a catalog of merchandise or services shown in the streaming content;

a fifth module executable by the computer for pausing the streaming content upon providing the connection to the catalog server and resuming the streaming content from the point where the streaming content was paused upon disconnecting the connection between the catalog server and the electronic device; and a sixth module executable by the computer for enabling the placement of the selection within a virtual shopping mall, the mall being accessible by members of a group selected by the viewer.

34. The computer program product as recited in claim 33, further comprising:

a seventh module executable by the computer for enabling members of the group to add supplemental content to the selection that is placed in the virtual shopping mall.

35. The computer program product as recited in claim 33, further comprising:

a seventh module executable by the computer for providing location information of a store having the merchandise or services based on the receiving of the viewer selection, and wherein the location information further comprises a map.

36. The computer program product as recited in claim 33, wherein the one or more markers further corresponds to an actor or character viewable within the content, and wherein the selection indicates interest in a specific merchandise or a specific service corresponding to the actor or the character.

37. A computer program product as recited in claim 33, further comprising:

a seventh module executable by the computer for monitoring purchases by the members of the group selected by the viewer to determine the effectiveness of viral marketing.

* * * * *